(12) United States Patent
Jevans

(10) Patent No.: US 10,505,933 B2
(45) Date of Patent: *Dec. 10, 2019

(54) SYSTEMS AND METHODS FOR SECURITY ANALYSIS OF APPLICATIONS ON USER MOBILE DEVICES WHILE MAINTAINING USER APPLICATION PRIVACY

(71) Applicant: Proofpoint, Inc., Sunnyvale, CA (US)

(72) Inventor: David Alexander Jevans, Menlo Park, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/276,590

(22) Filed: Feb. 14, 2019

(65) Prior Publication Data
US 2019/0182247 A1    Jun. 13, 2019

Related U.S. Application Data

(63) Continuation of application No. 15/819,607, filed on Nov. 21, 2017, now Pat. No. 10,270,769, which is a (Continued)

(51) Int. Cl.
*H04L 29/06* (2006.01)
*G06F 21/57* (2013.01)
(Continued)

(52) U.S. Cl.
CPC .......... *H04L 63/0876* (2013.01); *G06F 21/10* (2013.01); *G06F 21/51* (2013.01);
(Continued)

(58) Field of Classification Search
CPC ............... H04L 63/0876; H04L 9/3236; H04L 63/1433; H04L 63/123; H04L 63/168;
(Continued)

(56) References Cited

U.S. PATENT DOCUMENTS 7,814,554 B1   10/2010 Ragner
8,195,953 B1    6/2012 Yue et al.
(Continued)

FOREIGN PATENT DOCUMENTS

EP    3210364 A1    8/2017
EP    3213243 A1    9/2017
(Continued)

OTHER PUBLICATIONS

International Search Report and Written Opinion dated Jan. 15, 2016 in Patent Cooperation Treaty Application No. PCT/US2015/058488, filed Oct. 30, 2015, 14 pages.
(Continued)

*Primary Examiner* — Michael R Vaughan
(74) *Attorney, Agent, or Firm* — Carr & Ferrell LLP

(57) ABSTRACT

Systems and methods for analyzing applications ("apps") on a mobile device for security risks for a company while maintaining the mobile device owner's privacy and confidentiality concerning the applications. The mobile device may be a user's personal device (a "bring your own device"). In an example method, a process generates one or more cryptographic representations of application information for each application on the mobile device. The cryptographic representations may comprise a hash or composite hash. The cryptographic representations may be transmit outside the mobile device to a system which makes a determination and provides an indication whether the application is permitted or not permitted for use at the company. The company can be associated with a hashed permitted or not permitted list. The application information can include application name, executable code, and a version number. The method may include automatically remediating the application if it matches a known risk.

20 Claims, 8 Drawing Sheets

Related U.S. Application Data continuation of application No. 14/929,067, filed on Oct. 30, 2015, now Pat. No. 9,838,391.

(60) Provisional application No. 62/122,809, filed on Oct. 31, 2014.

(51) Int. Cl.

| | | |
|---|---|---|
| *G06F 21/10* | (2013.01) | |
| *G06F 21/51* | (2013.01) | |
| *G06F 21/54* | (2013.01) | |
| *G06F 21/55* | (2013.01) | |
| *G06F 21/64* | (2013.01) | |
| *H04L 9/32* | (2006.01) | |
| *H04W 12/10* | (2009.01) | |

(52) U.S. Cl.
CPC ............ *G06F 21/54* (2013.01); *G06F 21/552* (2013.01); *G06F 21/554* (2013.01); *G06F 21/57* (2013.01); *G06F 21/577* (2013.01); *G06F 21/64* (2013.01); *H03K 19/17728* (2013.01); *H03K 19/17768* (2013.01); *H04L 9/3236* (2013.01); *H04L 63/123* (2013.01); *H04L 63/1433* (2013.01); *H04L 63/168* (2013.01); *H04W 12/10* (2013.01); *G06F 2221/033* (2013.01)

(58) Field of Classification Search
CPC .......... G06F 21/10; G06F 21/64; G06F 21/57; G06F 21/554; G06F 21/552; G06F 21/54; G06F 21/51; G06F 21/577; G06F 2221/033; H04W 12/10; H03K 19/17768; H03K 19/17728
See application file for complete search history.

(56) References Cited

U.S. PATENT DOCUMENTS

| | | | | |
|---|---|---|---|---|
| 8,566,932 | B1* | 10/2013 | Hotta | G06F 11/00 |
| | | | | 726/2 |
| 8,776,168 | B1* | 7/2014 | Gibson | H04L 63/104 |
| | | | | 709/225 |
| 8,881,293 | B1* | 11/2014 | Brucker | G06F 21/577 |
| | | | | 717/126 |
| 8,966,640 | B1* | 2/2015 | Peddada | G06Q 10/0635 |
| | | | | 726/25 |
| 8,984,643 | B1* | 3/2015 | Krisher | H04L 63/1433 |
| | | | | 726/25 |
| 8,990,183 | B2* | 3/2015 | Liu | G06Q 30/0256 |
| | | | | 707/709 |
| 9,313,222 | B2* | 4/2016 | Huang | H04L 63/1433 |
| 9,548,987 | B1* | 1/2017 | Poole | H04L 63/1408 |
| 9,734,037 | B1* | 8/2017 | McCorkendale | G06F 11/3466 |
| 9,838,391 | B2 | 12/2017 | Jevans | |
| 9,967,278 | B2 | 5/2018 | Jevans et al. | |
| 10,097,576 | B2 | 10/2018 | Jevans et al. | |
| 10,270,769 | B2 | 4/2019 | Jevans | |
| 2003/0028363 | A1* | 2/2003 | Nobili | G06F 9/54 |
| | | | | 704/1 |
| 2003/0037107 | A1* | 2/2003 | Maeda | G06F 8/61 |
| | | | | 709/203 |
| 2006/0224742 | A1* | 10/2006 | Shahbazi | H04W 12/0027 |
| | | | | 709/226 |
| 2007/0101146 | A1* | 5/2007 | Louch | H04L 63/10 |
| | | | | 713/176 |
| 2007/0162894 | A1* | 7/2007 | Noller | G06F 11/3684 |
| | | | | 717/124 |
| 2009/0037367 | A1* | 2/2009 | Wein | G06F 9/5061 |
| 2009/0305671 | A1* | 12/2009 | Luft | G06Q 30/0205 |
| | | | | 455/411 |
| 2010/0192223 | A1* | 7/2010 | Ismael | G06F 21/566 |
| | | | | 726/22 |
| 2011/0145920 | A1* | 6/2011 | Mahaffey | G06F 21/564 |
| | | | | 726/22 |
| 2012/0030750 | A1 | 2/2012 | Bhargava et al. | |
| 2012/0036220 | A1* | 2/2012 | Dare | G06F 8/61 |
| | | | | 709/217 |
| 2012/0036552 | A1* | 2/2012 | Dare | H04L 41/0253 |
| | | | | 726/1 |
| 2013/0085914 | A1* | 4/2013 | McPherson | H04L 61/1511 |
| | | | | 705/34 |
| 2013/0097706 | A1* | 4/2013 | Titonis | G06F 21/56 |
| | | | | 726/24 |
| 2013/0111547 | A1 | 5/2013 | Kraemer | |
| 2013/0167207 | A1* | 6/2013 | Davis | G06F 21/316 |
| | | | | 726/5 |
| 2013/0167231 | A1 | 6/2013 | Raman et al. | |
| 2013/0227683 | A1* | 8/2013 | Bettini | G06F 21/57 |
| | | | | 726/22 |
| 2013/0263260 | A1* | 10/2013 | Mahaffey | G06F 21/564 |
| | | | | 726/22 |
| 2013/0318614 | A1* | 11/2013 | Archer | G06F 21/577 |
| | | | | 726/25 |
| 2013/0347094 | A1* | 12/2013 | Bettini | H04L 63/0245 |
| | | | | 726/11 |
| 2014/0040628 | A1* | 2/2014 | Fort | G06F 21/34 |
| | | | | 713/182 |
| 2014/0143864 | A1* | 5/2014 | Miliefsky | H04L 63/20 |
| | | | | 726/22 |
| 2014/0196150 | A1* | 7/2014 | Bettini | G06F 21/57 |
| | | | | 726/25 |
| 2014/0214610 | A1* | 7/2014 | Moshir | G06Q 20/4016 |
| | | | | 705/26.35 |
| 2014/0237545 | A1* | 8/2014 | Mylavarapu | H04L 63/1433 |
| | | | | 726/3 |
| 2014/0337937 | A1* | 11/2014 | Truskovsky | H04L 63/08 |
| | | | | 726/5 |
| 2015/0026826 | A1* | 1/2015 | Allegri | H04L 63/10 |
| | | | | 726/29 |
| 2015/0096022 | A1 | 4/2015 | Vincent et al. | |
| 2015/0172321 | A1* | 6/2015 | Kirti | H04L 63/20 |
| | | | | 726/1 |
| 2015/0188949 | A1* | 7/2015 | Mahaffey | H04L 63/20 |
| | | | | 726/1 |
| 2015/0205962 | A1* | 7/2015 | Swidowski | G06F 21/566 |
| | | | | 726/23 |
| 2015/0220734 | A1* | 8/2015 | Nalluri | G06F 21/51 |
| | | | | 726/23 |
| 2015/0304311 | A1* | 10/2015 | St. Clair | G06F 21/316 |
| | | | | 726/5 |
| 2015/0339477 | A1* | 11/2015 | Abrams | G06F 21/554 |
| | | | | 726/23 |
| 2015/0350240 | A1* | 12/2015 | Mitchell | H04L 63/1425 |
| | | | | 726/23 |
| 2016/0112451 | A1* | 4/2016 | Jevans | H04L 63/1433 |
| | | | | 726/25 |
| 2016/0127367 | A1* | 5/2016 | Jevans | H04L 63/1433 |
| | | | | 713/152 |
| 2016/0142418 | A1* | 5/2016 | Barton | H04L 63/10 |
| | | | | 726/4 |
| 2016/0253491 | A1* | 9/2016 | Fanton | G06F 21/10 |
| | | | | 713/165 |
| 2018/0077158 | A1 | 3/2018 | Jevans | |
| 2018/0227323 | A1 | 8/2018 | Jevans et al. | |
| 2018/0359277 | A1 | 12/2018 | Jevans et al. | |

FOREIGN PATENT DOCUMENTS

| | | |
|---|---|---|
| WO | WO2016064930 A1 | 4/2016 |
| WO | WO2016070135 A1 | 5/2016 |

OTHER PUBLICATIONS

International Search Report and Written Opinion dated Jan. 19, 2016 in Patent Cooperation Treaty Application No. PCT/US2015/056534, filed Oct. 20, 2015, 10 pages.

(56) References Cited

OTHER PUBLICATIONS

"Extended European Search Report," European Patent Application No. 15855709.0, dated Feb. 12, 2018, 10 pages.
"Extended European Search Report," European Patent Application No. 15853504.7, dated May 17, 2018, 7 pages.
"Office Action," European Patent Application No. 15853504.7, dated Apr. 26, 2019, 6 pages.

* cited by examiner

SYSTEMS AND METHODS FOR SECURITY ANALYSIS OF APPLICATIONS ON USER MOBILE DEVICES WHILE MAINTAINING USER APPLICATION PRIVACY

CROSS-REFERENCE TO RELATED APPLICATIONS

This application is a Continuation of U.S. patent application Ser. No. 15/819,607 filed Nov. 21, 2017, which is a Continuation of U.S. patent application Ser. No. 14/929,067 filed Oct. 30, 2015 and issued as U.S. Pat. No. 9,838,391 on Dec. 5, 2017, which claims the benefit of U.S. Provisional Application No. 62/122,809, filed on Oct. 31, 2014. The subject matter of the aforementioned applications is incorporated herein by reference for all purposes.

FIELD

The present technology is directed to computer security and risk analysis, and more particularly to systems and methods that assess and mitigate risk posed by applications that execute on mobile devices. The systems and methods operate in such a way that the privacy and confidentiality of the applications on the mobile devices are maintained, while allowing for detection and remediation of risk enhanced applications. To be sure, these devices can operate on various networks and pose risks to the network if the applications on the mobile devices perform malicious or risk enhancing operations.

SUMMARY

According to various embodiments, the present technology is directed to a method comprising: (a) receiving a request from a computing device, the request comprising a cryptographic representation of application information for an application residing on a mobile device; (b) comparing the cryptographic representation to an application information database that comprises cryptographic representations of applications and information that indicates whether the applications are a security risk; and (c) automatically remediating the application if the application matches an application that is a known risk in the database.

According to various embodiments, the present technology is directed to a method, comprising: (a) generating a cryptographic representation of application information for an application residing on a mobile device; (b) transmitting the cryptographic representation to an application risk control system; and (c) receiving a message from the application risk control system indicating whether the application is permitted or not permitted. The cryptographic information can include a hash value of the executable code of the application, a name of the application, as well as a version number for the application and a company name.

According to various embodiments, the present technology is directed to a system comprising: (a) a mobile device management system for controlling, at least in part, configuration of a mobile device, the controlling including controlling whether the mobile device is permitted to access an enterprise network with enterprise services; (b) an application risk control system that is configured to utilize: (i) an application information database that comprises application information for applications, the application information comprising at least one of application behaviors, application names, cryptographic representations of applications, and risk scores of applications; and (ii) an application cryptographic table that comprises cryptographic representations of applications associated with at least one of a whitelist or a blacklist. In some embodiments, the application risk control system is configured to: (1) receive a cryptographic representation of application information for an application residing on a computing device, the computing device being used to access the enterprise network; (2) compare the cryptographic representation to the application information database and the application cryptographic table; and (3) automatically remediate the mobile device (e.g., from a mobile device management system) if the application matches an application that is a known risk as determined from the comparison with the application information database and the application cryptographic table.

According to various embodiments, the present technology is directed to a method, comprising: (a) receiving a request from a mobile device, the request comprising at least one of: (i) a list of application behaviors for an application that resides on the mobile device, the request not comprising identifying information for the application; (ii) a cryptographic representation of the application; and (iii) a risk score calculated for the application; (b) comparing the list of application behaviors to approved and disapproved application behaviors; (c) comparing a cryptographic representation of the application that resides on the mobile device to an application information database that comprises blacklisted and whitelisted applications; (d) comparing the risk score to a risk score threshold; (e) automatically remediating at least one of the application and the mobile device if at least one of: (1) the list of application behaviors includes at least one disapproved application behavior; (2) the cryptographic representation of the application matches a blacklisted application; and (3) the risk score exceeds the risk score threshold.

According to some embodiments, the application risk control system is configured to receive status communicated from the mobile device, the status being status regarding compliance or non-compliance, the status being other than information about the applications on the mobile device.

According to some embodiments, automatically remediating can include, for example, transmitting a warning to a user of the mobile device or a system administrator, quarantining the application, quarantining the mobile device, to name a few remediations.

According to some embodiments, a designated application of the applications resident on the mobile device makes the request (of the method), the designated application being the only one of the applications which knows the identity of the rest of the applications on the mobile device, the designated application being configured for communicating the cryptographic representations for the applications to the application risk control system outside the device, the application risk control system being configured to perform the comparing and does not log the identity of the mobile device making the request, such that identifying information about the mobile device is not transferred from the mobile device.

According to some embodiments, a non-transitory computer-readable storage medium is provided having embodied thereon instructions, which, when executed by at least one processor, perform steps of the method according to the present technology.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
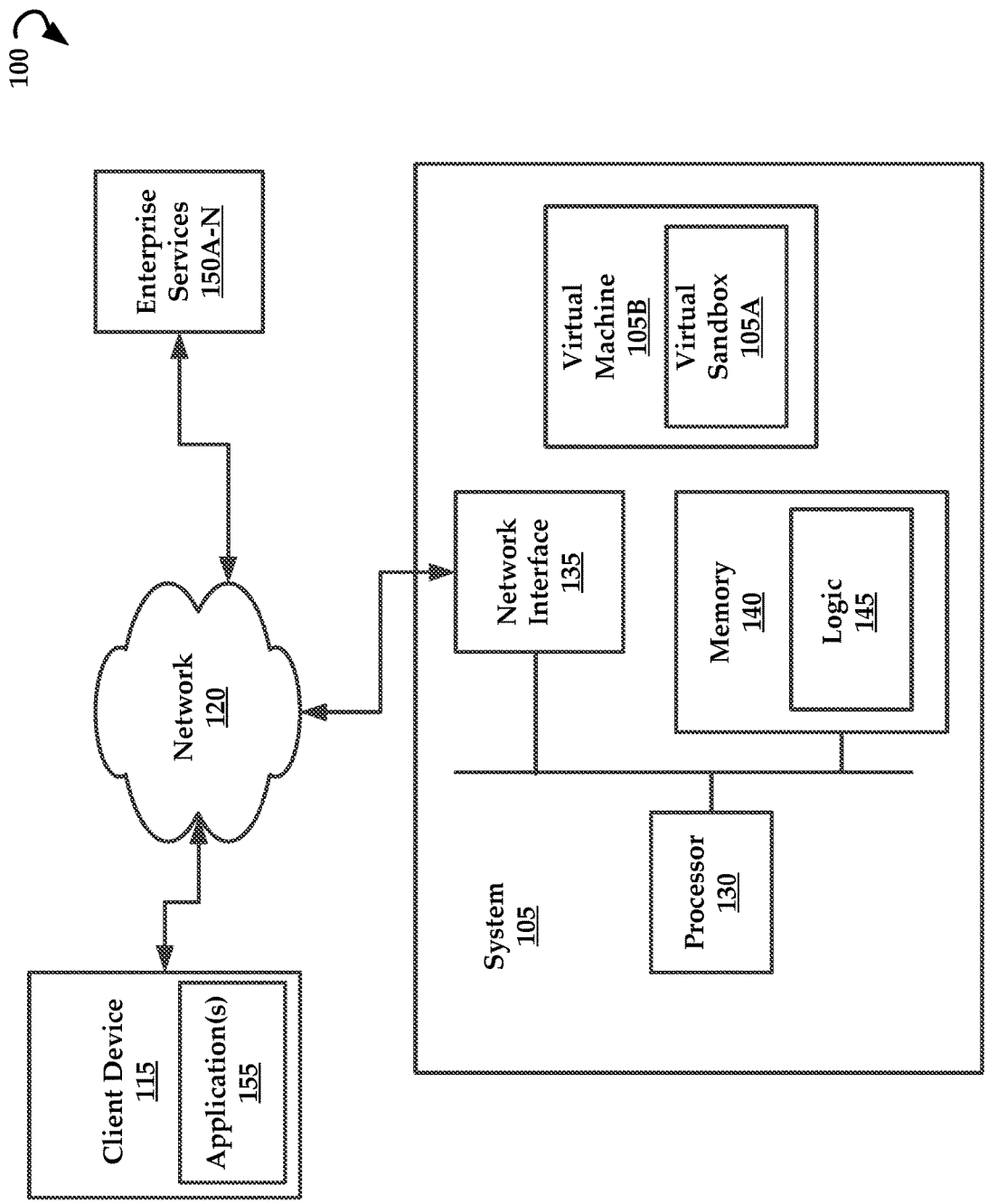
FIG. 1 is a schematic diagram of an example system for practicing aspects of the present technology.

The present disclosure relates generally to risk scoring system and methods which are configured to understand how applications on mobile devices present risk to consumers and companies.

The present disclosure can be utilized by companies that allow employees to bring their own mobile devices, such as smartphones, tablets, and wearables, into the company. It is also applicable to companies that allow mobile devices to be used by employees where the company purchases the device. Various embodiments allow companies to assess risk that applications on user devices (e.g., clients) pose to the company, and to control this risk. Various embodiments are also directed at consumer users who wish to know if applications on their phones, tablets, wearable (or other end user computing devices) pose a risk to their privacy, have risks of data leakage, or are malicious—just to name a few.

In some embodiments, a risk score number is provided that provides a simple representation of a risk level associated with an application to a user or a company. This risk score may or may not be customized to the company or user, based on policies.

In some embodiments, a set of risk numbers is provided that provides a detailed risk score of an application to a user or a company. These risk numbers may or may not be customized to the company or user, based on policies. These risk numbers could be characterized into different categories such as privacy risk, data leak risk, account takeover risk, device takeover risk, and malware—just to name a few.

In another embodiment, the risk analysis system could connect directly to a mobile device management system or similar computer and mobile device management system, to automatically provide instructions to the system to take actions based on the risk scores. Examples of actions include quarantining or retiring the client.

In another embodiment, the risk analysis system could provide detailed information about any behaviors of the application which can be correlated with external information. For example, the systems and methods can correlate websites that an application communicates with against known websites operated by criminals.

According to some embodiments, the present technology may include various processes such as a deep analysis of an application's behavior, an overall risk scoring, transmission (e.g., communications) risk scoring, risk categorization, combination of categorized scores into a single (composite) score, factoring the combined score by a publisher reputation, overriding scores (or prior to scoring) with whitelists and blacklists, and normalizing scores to a pre-defined range (for example 0-10 or 0-100)—just to name a few.

Risk scoring may have more or fewer stages than described in the various flowcharts herein, depending on the embodiment. The phases of the mechanism could be re-ordered from the example flowcharts and still have the same innovative results.

To be sure, the present technology can be implemented as a network-based service, accessible over the Internet or other computer network, where applications are collected or submitted for risk analysis. This service can be queried by reporting tools, investigators, end users, other applications, mobile device management systems, enterprise mobility management systems, data feed engines, as well as other technologies which would be known to one of ordinary skill in the art. In other embodiments, the present technology can be implemented at the device level or in an enterprise network.

These and other advantages of the present technology are provided herein with reference to the collective drawings.

FIG. 1 illustrates an exemplary architecture 100 for practicing aspects of the present technology. The architecture comprises a mobile device management system, hereinafter "system 105" that is configured to provide various functionalities, which are described in greater detail throughout this document. Generally the system 105 is configured to communicate with client devices, such as client device 115. The client device 115 may include, for example, a Smartphone, a laptop, a computer, or other similar computing device. An example of a computing device that can be utilized in accordance with the present technology is described in greater detail with respect to FIG. 5.

The system 105 may communicatively couple with the client device 115 via a public or private network, such as network 120.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 120 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or other networking.

The system 105 generally comprises a processor, 130, a network interface 135, and a memory 140. According to some embodiments, the memory 140 comprises logic (e.g., instructions) 145 that can be executed by the processor 130 to perform various methods, which are described in greater detail herein.

In some embodiments, the system 105 can facilitate a virtual sandbox 105A that is executed by a virtual machine 105B.

It will be understood that the functionalities described herein, which are attributed to the system 105 may also be executed within the client device 115. That is, the client device 115 may be programmed to execute the functionalities described herein. In other instances, the system 105 and client device 115 may cooperate to provide the functionalities described herein, such that the client device 115 is provided with a client-side application that interacts with the system 105 such that the system 105 and client device 115 operate in a client/server relationship. Complex computational features may be executed by the server 105, while simple operations that require fewer computational resources may be executed by the client device 115, such as data gathering and data display.

In some embodiments, the client device 115 can be utilized by a user to access various enterprise services 150A-N. The client device 115 can also store and execute one or more applications, such as application(s) 155.

The execution of the application(s) 155 by the client may result in deleterious effects such as data leakage, malware, account takeover and other effects described herein. These effects can cause damage not only to the client device 115, but also the enterprise services 150A-N when the client device 115 accesses the enterprise services 150A-N over the network 120.

Various embodiments of the present disclosure provide for the system 105 to determine what applications reside on the client device 115 and perform one or more security verification processes on the applications to determine if the client device 115 can be allowed to access the enterprise services 150A-N.

The applications can be tested in a variety of manners and scored variously by the system 105 to determine their risk levels. Again, these risks involve not only possible deleterious effects to the client device 115 but also other clients on the network 120 and any enterprise services 150A-N.

Figure 2:
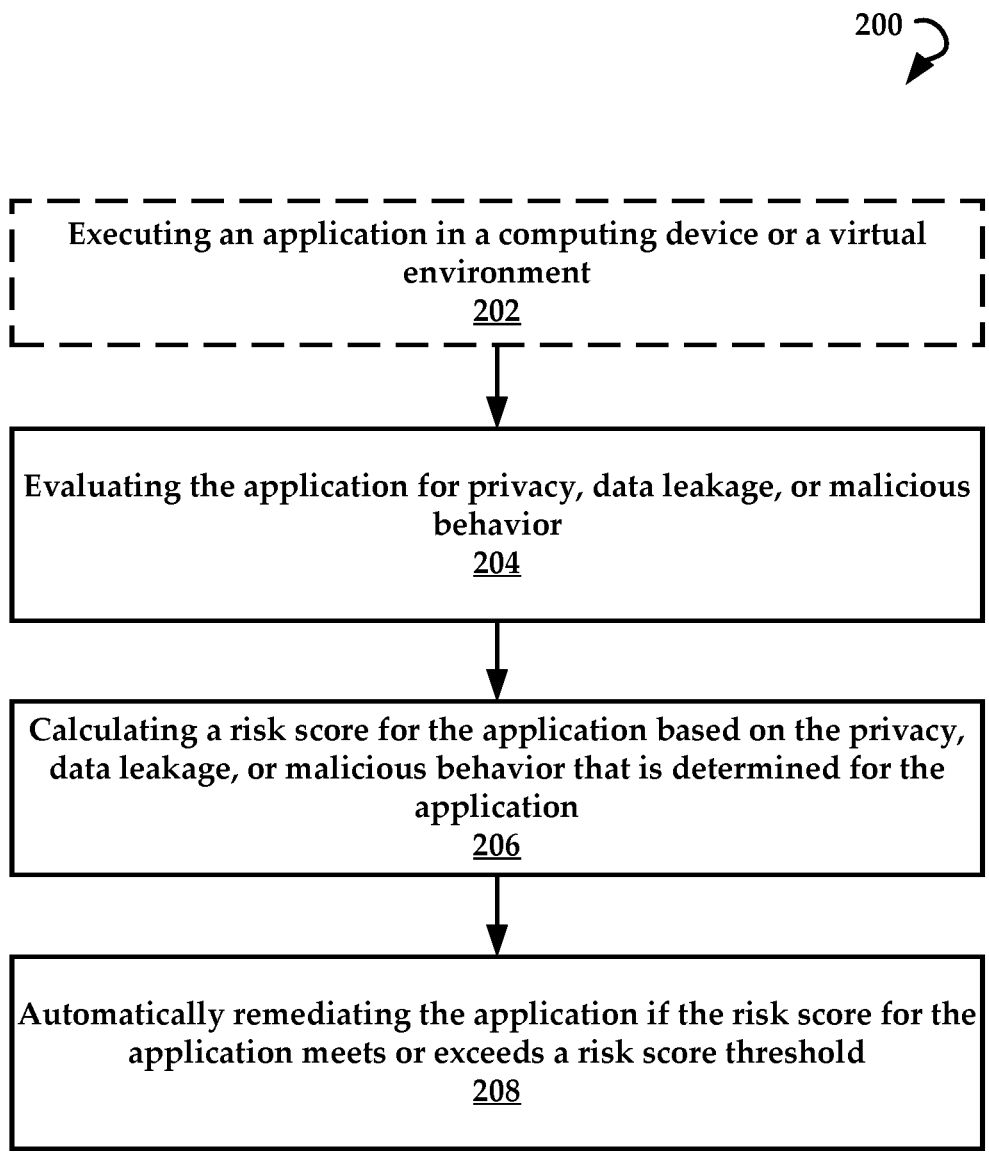
FIG. 2 is a flowchart of a method of application risk analysis.

FIG. 2 is a flowchart of an example method 200 that can be implemented within the system 105 described above. In one example, the method begins when a client device attempts to access an enterprise network and one or more enterprise services such as email, databases, security, or other services. The system 105 can evaluate applications on the client device to determine a risk level therefor. In another example, the method begins when a client device desires to determine a risk level for one or more applications that are available for download (or already installed on the client device).

In either of these examples, the method may include executing at operation 202, an application in a computing device or a virtual environment. An example virtual environment could include a sandbox environment on a virtual machine created by the system 105. In another embodiment, the application can be executed on a test client device and monitored by the system 105 for various behaviors, as will be described in greater detail infra.

In some embodiments, the application can be evaluated without directly or indirectly executing the application in a sandbox or on a physical computing device. For example, some facets of risk can be evaluated without executing the application such as developer reputation analysis or an analysis of the name of the application against a black or white list of application names. Furthermore, static analysis may be performed, in some embodiments, without executing the application. Thus, operation 202 is optional (shown dashed) based upon the type of application risk analysis/evaluation being performed.

The method may comprise evaluating at operation 204 the application for privacy, data leakage, or malicious behavior—just to name a few. In general, with respect to privacy, an application that leaks a user's private information to a third party server is a privacy risk. Information usually considered private includes, but is not limited to, geolocation data, network connectivity, email addresses, contacts, and other user specific information. Other types of private information include health information, banking information, authentication information, and so forth. Data leakage can refer generally to an application has the potential to transmit data to a third party server or a network observer. In more detail, applications that transmit unencrypted data, or connect to file sharing services have a high data leak risk. Similarly, some applications can automatically send data from a device, or allow users to upload data to untrusted third party services. These applications can pose data leak risk.

With respect to malicious behavior, malware is a category of application that was built with criminal intent. Applications that place phone calls or send text messages to expensive paid offshore numbers are common examples. Applications that use a mobile device as a proxy for spam or phishing, send users to phishing websites, or use known brand names without their permission are also malware. Again, these are merely examples of malicious behaviors that can be detected by the system 105. Thus, the system 105 is configured to evaluate the application for a wide variety of known malware related activities.

Each of these application facets such as privacy, data leakage, or malicious behavior are comprised of numerous application behaviors for which the system 105 will monitor and log. As these behaviors are identified, the system 105 can score these behaviors and create individual scores for privacy, data leakage, or malicious behavior. In various embodiments, the calculation take into account (e.g., in the risk score calculation) not only the type of risk presented, but also the nature of the risk. For example, the severity of a risk associated with permissions will be higher if the permissions' risk involves the application accessing the device's camera as compared to the application merely accessing the Internet. In another example, the risk score can be scaled higher if the application looks up the device's hardware identification and allows tracking of the user and the device, or, for another example, the application attempts to write device security settings which are usually malicious. In another non-limiting example, merely accessing a network connection by the application presents one level of risk factored in, whereas an application that can read the low-level system log file, which could expose other application data is given a much higher weight for affecting the risk score. Other examples and factors for the score calculation are described further herein. Examples of evaluating a plurality of applications on a mobile device for privacy, data leakage, or malicious behavior; calculating a risk score for each of the plurality of applications based on the evaluating; determining whether each of the plurality of applications meets or exceeds a risk score threshold; and automatically remediating the applications, of the plurality of applications, for which the risk score meets or exceeds the risk score threshold, are found in commonly assigned U.S. application Ser. No. 14/918,535, entitled "Systems and Methods for Application Security Analysis", filed Oct. 20, 2015 and incorporated by reference herein.

Next, the method can include the system 105 calculating, at operation 206, a risk score for the application based on the privacy, data leakage, or malicious behavior that is determined for the application. In some embodiments, this score is a composite (e.g., average or weighted combination) of the privacy, data leakage, or malicious behavior scores calculated from the various behaviors determined for the application. The score can be normalized to a number that falls within a range of zero to 10, where zero indicates no risk whatsoever and 10 indicates an extreme danger.

The method may comprise the system 105 automatically, at operation 208, remediating the application if the risk score for the application meets or exceeds a risk score threshold. For example, a risk score threshold of five can be set in some embodiments. Thus, any application with a risk score that exceeds five will be remediated (e.g., quarantined or retired—to name a few possible remediation options).

Quarantining a mobile device (e.g., client device) is a remediation option when administrator-defined risk threshold settings are exceeded. The system 105 can temporarily restricts access to enterprise services by using administrator defined labels (e.g. "Quarantine-Level-1") in the system. Devices are automatically removed from quarantine when the user brings the device back into compliance, typically by removing the risky application.

Figure 3:
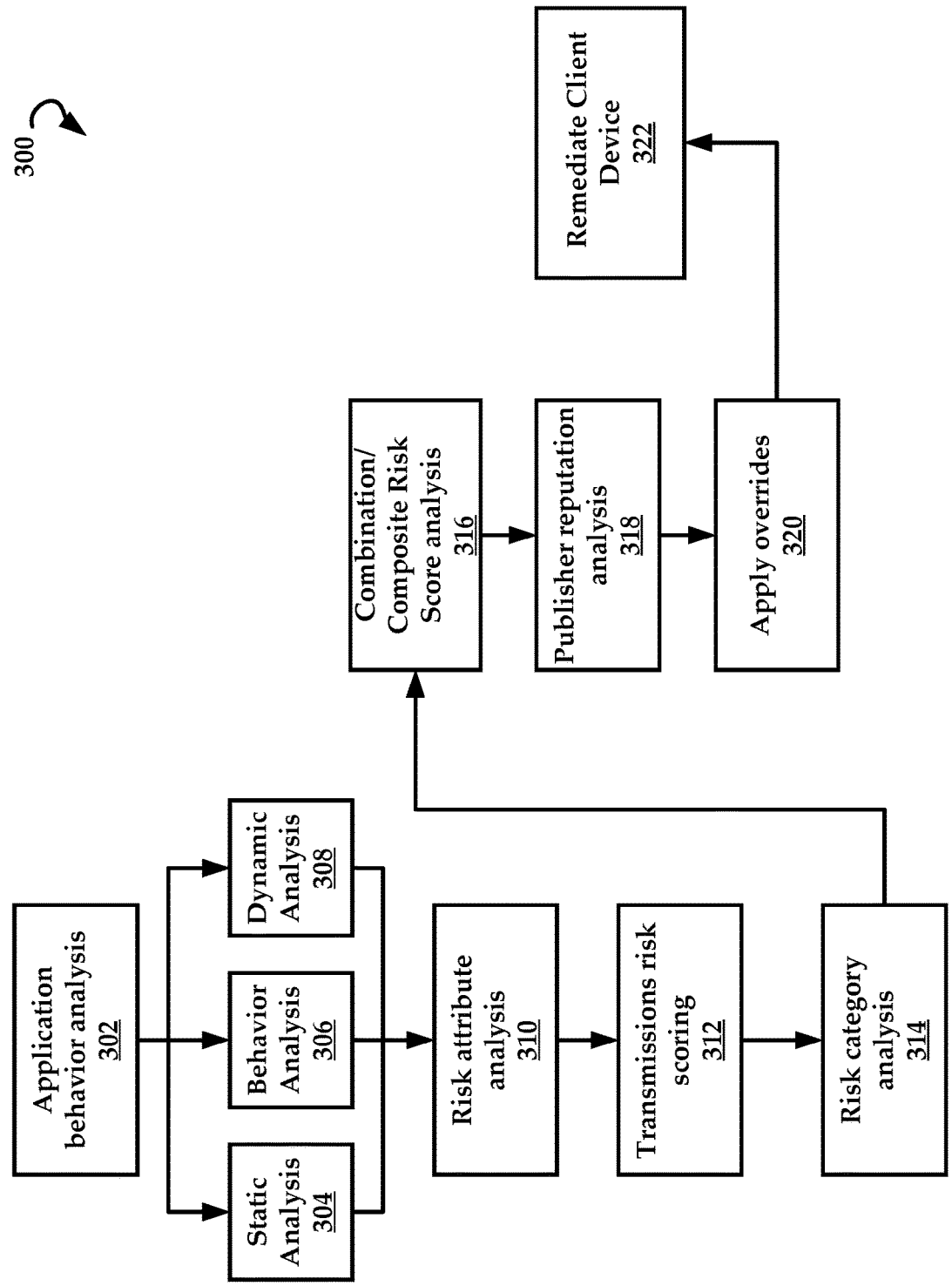
FIG. 3 is schematic flow diagram of a method for application risk analysis and device remediation (e.g. quarantining).

An alternative to quarantining the client device includes retiring the device. A retired device will no longer be allowed to access managed enterprise resources, such as email, VPN and other enterprise services. In other embodiments, a warning can be transmitted to the client device FIG. 3 illustrates another example application risk analysis method 300 that can be performed using the system 105 of FIG. 1. In some embodiments, the system 105 performs seven distinct categories of analysis on an application before determining an overall risk score. The application can undergo static, dynamic, and/or behavioral analysis to determine whether the application contacts remote servers and sites, seeks permission to access private user information, encrypts information when transmitted, and the publisher's reputation—just to name a few. Again, other permutations of application behaviors can also likewise be analyzed.

In an initial operation 302 analysis of application behavior is performed. To be sure, mobile applications are designed to perform a number of operations, while also interacting with remote databases, servers and services, to deliver specific functionality. Each individual operation is known as an application behavior.

In some embodiments, the system 105 categorizes five categories of malicious app behaviors, which include, but are not limited to data leakage, account takeover, device takeover, privacy, and malware. Each of these analyses will be described in greater detail below.

On a more generalized level, the system 105 can perform static analyses, behavior analysis, and dynamic analyses. In general, a static analysis at operation 304 can be performed to determine any differences between declared permissions of an application, and what the code for the application specifies. With risky applications there is frequently a disparity between stated permissions and coded permissions. As described above, static analysis may be performed without executing the application.

With respect to behavior analyses at operation 306, the application can be executed in a physical or virtual environment (such as a sandbox) to understand operations of the application, what data is accessed by the application (on the client device or on a network resource), and where data is sent during execution of the application.

A dynamic analysis at operation 308 involves the system 105 analyzing the behaviors of the application over time. This can include the system 105 simulating different user behaviors and different network topologies against the application. For a non-limiting example of such simulating, the system 105 may create "fake" email, social media or other accounts for the mobile device and/or user along with fake credentials, and then monitor whether an application on the mobile device (or other devices) attempt to access the fake account and attempt to engage in other suspicious activity. In various embodiments, this suspicious activity negatively affects the application and publisher score.

In another embodiment, the method comprises the system 105 performing a risk scoring and/or risk attribute analysis at operation 310. By definition, a risk attribute is a detailed action taken by an application that contributes to increasing risk. Many permutations of risk attributes may be analyzed and contribute to the overall risk score of an application. There may be more or less risk attributes, depending on the embodiment. Typically, the term risk attribute is synonymous with risky behavior of an application. For example, an application that is likely to leak data is more risky than an application that does not leak data. Other examples of risky behavior are described throughout this description.

Another score that can be calculated by the system 105 includes performing a transmissions risk scoring at operation 312 (also referred to as network reputation scoring). In some embodiments, this includes the system 105 conducting an analysis of how the application communicates with websites, servers, IP addresses, and other network resources. For instance, a server that is operated by a trusted company will have a better network reputation than a server that is known to host phishing or malware sites, or has been involved in electronic crime activities. If an application is found to communicate with a risky network resource, the application's overall risk score will increase, as well as any individual scores calculated for transmissions risk. Thus, in some embodiments, the transmissions risk can include a score for a network resource(s) contacted or utilized by the application.

In another embodiment, the method can include performing a risk category analysis at operation 314 where the system 105 groups pluralities of dangerous application behaviors into a plurality of specific risk categories. In some embodiments, the risk categories can include privacy risk, data leak risk, account takeover risk, device takeover risk and malware risk. These scores can be utilized by the system to calculate a component risk score. In some embodiments, a highest of these individual risk scores becomes the composite risk score. In other embodiments there could be more or fewer risk categories added to the component risk score. In some embodiments, there is no component risk score, but application behaviors are grouped into risk categories for future reference.

An account takeover risk occurs when an application has access or control to authentication credentials for a user account. One example includes an application that can transmit usernames and passwords for email access. Other examples include authentication credentials for enterprise services or social networks. The account takeover risk may include accessing an online account associated with the user of the mobile device in an unauthorized way (i.e., in way that is not authorized by the user). For instance, the account takeover risk may include accessing the user's account in a way beyond the authorization of a user, such as only being authorized to place an image in a cloud file storage account, but also accessing other files at that account. In some embodiments, the account takeover risk includes accessing of an online account not associated with the user of the mobile device or authorized for the application.

Data leak risk involves an application that has potential to transmit data to a third party server or a network observer. Applications that transmit unencrypted data to any third party can cause a data leak risk. Other examples include applications that transmit data from a device or allow a user to upload data to untrusted third party services.

With respect to device takeover risks, an application that can be (or is known to) used by a third party to take control of the client device are known as a takeover risk. Indicative actions of an application that has takeover risk include transmission of hardware identification information or violation of policies for accessing restricted application programming interfaces (APIs). Other example actions include any attempt to jailbreak or root the device are indicative of high risk. These actions are performed when the device is being used to install applications or perform tasks not allowed by the hardware manufacturer or network administrator.

Another risk involves malware. As mentioned above, malware is a category of application or service that was built with criminal intent. For example, applications that make phone calls or send text messages to expensive paid offshore numbers are malware. Applications that use a mobile device as a proxy for spam or phishing, send users to phishing websites, or use known brand names without their permission are also malware. These are merely examples of a few types of malware and are provided as examples only. One of ordinary skill in the art will appreciate that other types of malware can be detected and included by the system 105.

A privacy risk includes an application that leaks or exposes sensitive information to a third party. Examples of private information include, but are not limited to, geolocation data, names, addresses, email addresses, contacts, network connectivity, account numbers, or any sensitive information designated under a state and/or federal law.

The method can also include at operation 316, a combination or composite (risk) score may be determined that summarizes the component risk score. The composite aspect may comprise, for example, an average or weighted combination of the privacy, data leakage, or malicious behavior (component) scores calculated from the various behaviors determined for the application. The composite score can be normalized to a number that falls within a range of zero to 10, where zero indicates no risk whatsoever and 10 indicates an extreme danger.

The method may include defining attribute settings for the application. If any of these attributes are present, a notification to a system administrator can occur. These attributes can also cause behavioral overrides, i.e., overriding the score otherwise calculated. In some embodiments, the attributes may include variously, for example, storing credentials without encryption; accessing Bluetooth sharing; accessing the Internet, external storage, or cloud file storage (for various providers); accessing an input method editor/Unique Device Identifier (IME/UDID); sending International Mobile Equipment Identity number (IMEI) which may be a serial number which identifies the user's mobile device; attempting to root or jailbreak the device; malware or spyware; accessing the user's address book, contacts, calendar, camera, or microphone Short Message Service (SMS) archive; and the application attempting to access analytics and crash reporting associate with the mobile device and user.

In some embodiments, the method can include comparing various attributes of an application to a whitelist or blacklist. Applications matching entries on the whitelist are automatically assigned a risk score of zero. Conversely, matching entries on the whitelist are automatically assigned a risk score of ten, regardless of their behavior. These applications can be defined in the lists by a system administrator or other information source that identifies safe and dangerous applications.

In some embodiments, the method can include performing, at operation 318, an analysis of publisher reputation. A publisher reputation score evaluates an overall risk of the complete catalogue of applications and their versions released by a specific publisher. Publishers that have released a single application, and those with very few downloads, will receive a higher publisher risk score (and lower reputation) than a publisher with a numerous applications and thousands of downloads and positive user reviews. Publisher reputation is used as one factor in determining the risk of a specific, individual application (e.g., in calculating the risk score for an application). For example, two applications that have the exact same behaviors and risk scores will have different risk scores if one comes from an unknown publisher, and one comes from a known publisher such as Twitter, Inc™ The application developer can be placed onto the blacklist if their publisher reputation score does not meet or exceed a publisher reputation score threshold. In some embodiments, the method includes comparing the application to a blacklist of applications, wherein, if at least one of the applications and an application developer of the application is listed on the blacklist, the application is automatically remediated.

According to some embodiments, the method can include an override process where applications are initially scored by the system 105. Next, application overrides can be applied at operation 320 where administrators and users can be notified if certain behaviors are not permitted or are considered by the system 105 to be risky.

As mentioned above, the client device executing the application can be quarantined or retired based on these overrides. In some embodiments, a behavior override can occur when the application accesses a service or network resource that is restricted. For example, a system administrator can determine that a cloud storage service is restricted. The system 105 can warn the user when an attempt to access this resource occurs, as well as warn an administrator. In some embodiments, the client device is quarantined or retired.

In some embodiments, the method includes the quarantining or other remediation, at operation 322, of the client (e.g., mobile) device. In some embodiments, the quarantining or other remediation may be for a period of time (e.g., days) to give a user time to take steps (e.g., remove risky application(s)) to place the mobile device into compliance where quarantining or other remediation would no longer be warranted. In some embodiments, during the period, the user may be given access to email in order to notify the user that a fix is required to bring the device into compliance, and optionally, to also inform the user of the consequences of failing to do so. If the user fails to take such steps, in this example, the device may be retired or other unconditional quarantining or other remediation may be instituted.

Additional actions that can occur when a device or application violates a policy include, but are not limited to, locking of the device. For example, when an application exceeds administrator-defined risk threshold settings, a device can be locked, forcing the user to log out and log back in with the device password. Locking a device may also keep a user from accessing the device until it is unlocked by a third party administrator or software or online service.

Remediation can also occur. When an application exceeds administrator-defined risk thresholds several remediation actions may be taken such as notify the user, warn the user, retire the device, or quarantine the device. There may be more remediation options, depending on the embodiment.

Retiring a device is a remediation option when administrator-defined risk threshold settings are exceeded in which the user is removed from the mobile device management (MDM) system, cutting off all MDM-managed enterprise access, such as email, calendaring, corporate applications— just to name a few.

Quarantining a mobile device is a remediation option when administrator-defined risk threshold settings are exceeded in which the system temporarily restricts access to MDM-managed enterprise services by using administrator defined labels (e.g., "Quarantine-Level-1") in the MDM system. Devices are automatically removed from quarantine when the user brings the device back into compliance, typically by removing the risky application. Thus, in some embodiments, the system 105 can inventory the applications on each client device before it accesses any enterprise or network resources.

Figure 4:
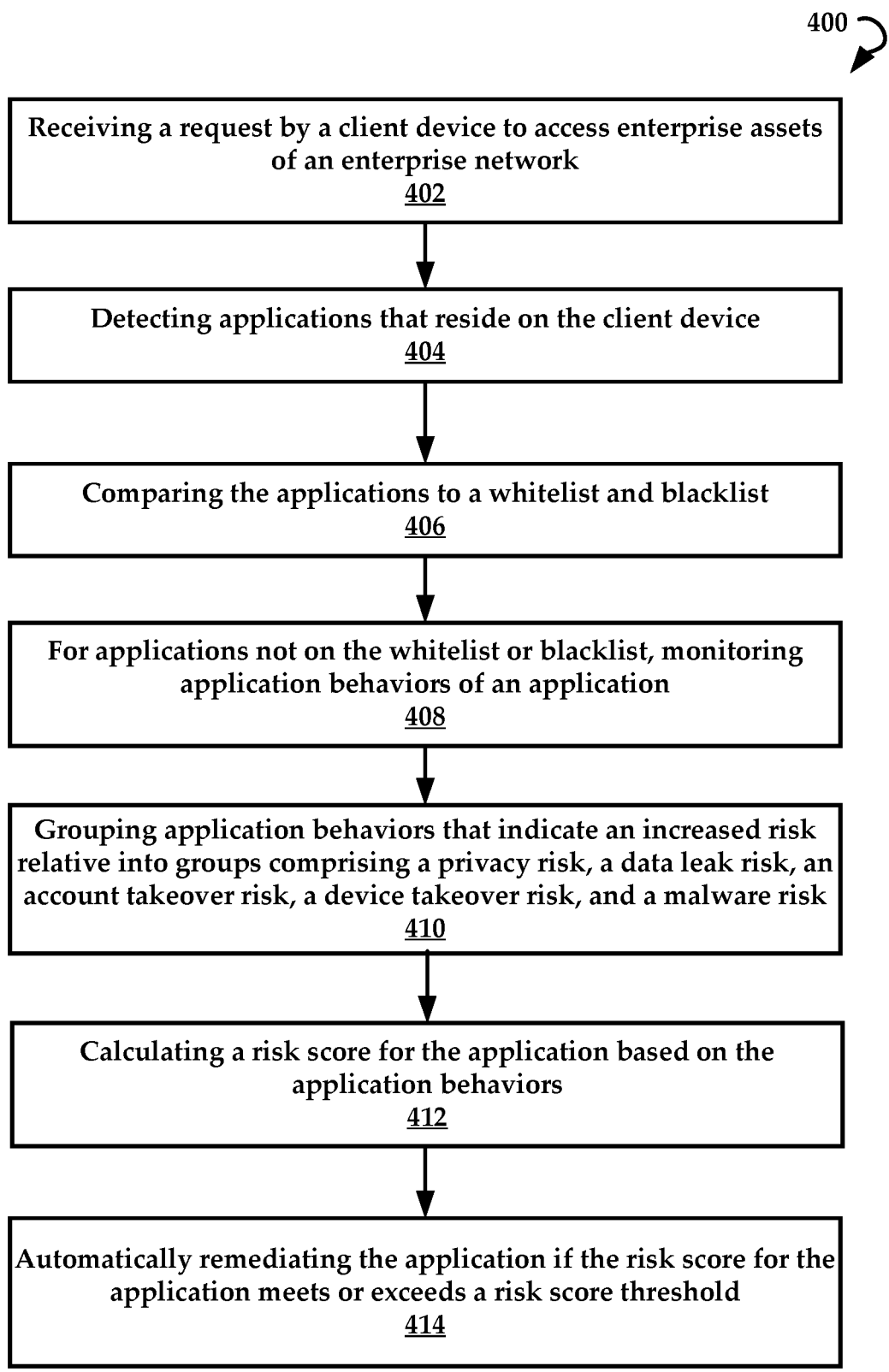
FIG. 4 is a flowchart of another method of application risk analysis.

FIG. 4 is a flowchart for an exemplary method 400 for determining risk for an application executing on a client device that is attempting to access network resources.

In some embodiments, the method includes receiving, at operation 402, a request by a client device to access enterprise assets of an enterprise network. Once the request is received, the method includes detecting, at operation 404, applications that reside on the client device.

The method can then include a process for determining a risk score for applications detected on the client device. The method can include initially comparing, at operation 406, the applications to a whitelist and blacklist. For applications not on the whitelist or blacklist, the method can include monitoring, at operation 408, application behaviors of an application. Again, this could include examining input and/ or output of the application, as well as the network resources access by the application (e.g., third party servers not within the enterprise network).

The method can also include grouping, at operation 410, application behaviors that indicate an increased risk relative into groups comprising a privacy risk, a data leak risk, an account takeover risk, a device takeover risk, and/or a malware risk.

Once the behaviors are grouped, the method can include calculating, at operation 412, a risk score for the application based on the application behaviors. In some embodiments, an intermediate step of calculating scores for each of the risk groups can occur. The general risk score can be a composite of these individual risk scores, selected combinations of the individual scores, weighted portions of individual scores, and combinations thereof. A weighted score can be achieved by multiplying a risk group score by a weighting coefficient. For example, if one desires the privacy risk score to be weighted more heavily, a coefficient of 0.9 can be applied to the privacy risk score. Conversely, if one desires the data leak risk score to be weighted less heavily, a coefficient of 0.2 can be applied to the data leak risk score.

The method may include automatically remediating (e.g., quarantining or other remediating options), at operation 414, the application if the risk score for the application meets or exceeds a risk score threshold. The method may include automatically remediating (e.g., quarantining or other remediating options), at operation 414, the application if the risk score for the application meets or exceeds a risk score threshold.

It will be understood that not all steps illustrated in FIGS. 2-4 are required in each embodiment. Various permutations and changes to the methods are contemplated.

As used herein, the term "engine", "system", "client", "module", "controller", or "application" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

According to some embodiments, some enterprise networks or companies may implement privacy policies or end user agreements for users that specify that privacy will be maintained with respect to identification of applications that reside on the user devices. These privacy policies can be self-imposed or required by a state, federal, or international law. To these ends, it is desirable for companies to comply with any privacy policies while at the same time protecting the integrity and security of their enterprise network. The following sections describe embodiments of systems and methods that provide for analysis of applications on user devices while maintaining user application privacy.

In sum, these systems and methods allow companies to place restrictions, generate reports, or implement other controls on computing devices that have installed applications, while preserving the privacy of the users of the computing devices by not enabling the company or any third party suppliers without disclosure or knowledge of what applications are installed on the computing devices.

For context, in corporate computing environments, mobile devices are becoming increasingly prevalent. Employees are often using their own devices to access corporate apps, data and computing resources. Companies are widely using Mobile Device Management (MDM) systems which allow companies to provide controls over the configuration (such as installed applications and device behaviors) of mobile devices. In order to manage the risk of applications on these devices, which might leak corporate data, compromise the security or privacy of the users, companies are retrieving a list of the applications on user devices. These lists can be used in conjunction with applications risk scoring systems (as described in greater detail above), anti-virus systems, blacklists and whitelists. However, this now exposes companies to various risks and regulatory compliance problems, because the company now knows what applications are on a user's device. To be sure, users may be using personal devices (so-called Bring Your Own Device). In many industries companies are prohibited (either contractually or by operation of law) from knowing what applications are on a user's personal device. For example, many companies have internal policies preventing them from knowing what is on a user's device.

In some embodiments, an example system provides companies with controls to prevent specific applications or applications with specified behaviors from being used by employees. This control can occur without the company having any visibility into what applications are being used by the employees.

Companies may implement whitelists (permitted) and blacklists (not permitted) of applications that may and may not be used on employee devices; without requiring the devices to download or have a copy of the blacklists or whitelists, and without the company knowing which applications are on user's devices, according to various embodiments.

Various embodiments allow companies to restrict the applications that may be used on employee devices by certain behaviors of the applications again, without knowing which applications reside on a user's device.

In some embodiments, the present technology allows companies to restrict the applications that may be used on employee devices, by applying risks scores, anti-virus scores, malware analysis, and other analyses or combinations of analyses.

A Mobile Device Management (MDM) system may be used to control the configurations and behaviors of the user devices. In various embodiments, the MDM system and the company do not know which applications are on a user's device. That is, the MDM system may be walled off from direct access to the mobile device and its configurations.

A third party application risk scoring mechanism or service can be used in conjunction with a Mobile Device Management system. In some embodiments, an application resides on a user's device which communicates with the application risk scoring system.

In various embodiments, an application is installed/present on a user's device which communicates with an application blacklist and whitelist system. This system can be implemented as a DNS responder or server. In some embodiments, an application is present on a user's device which communicates with an MDM system. These and other advantages will be described in greater detail below.

Figure 5:
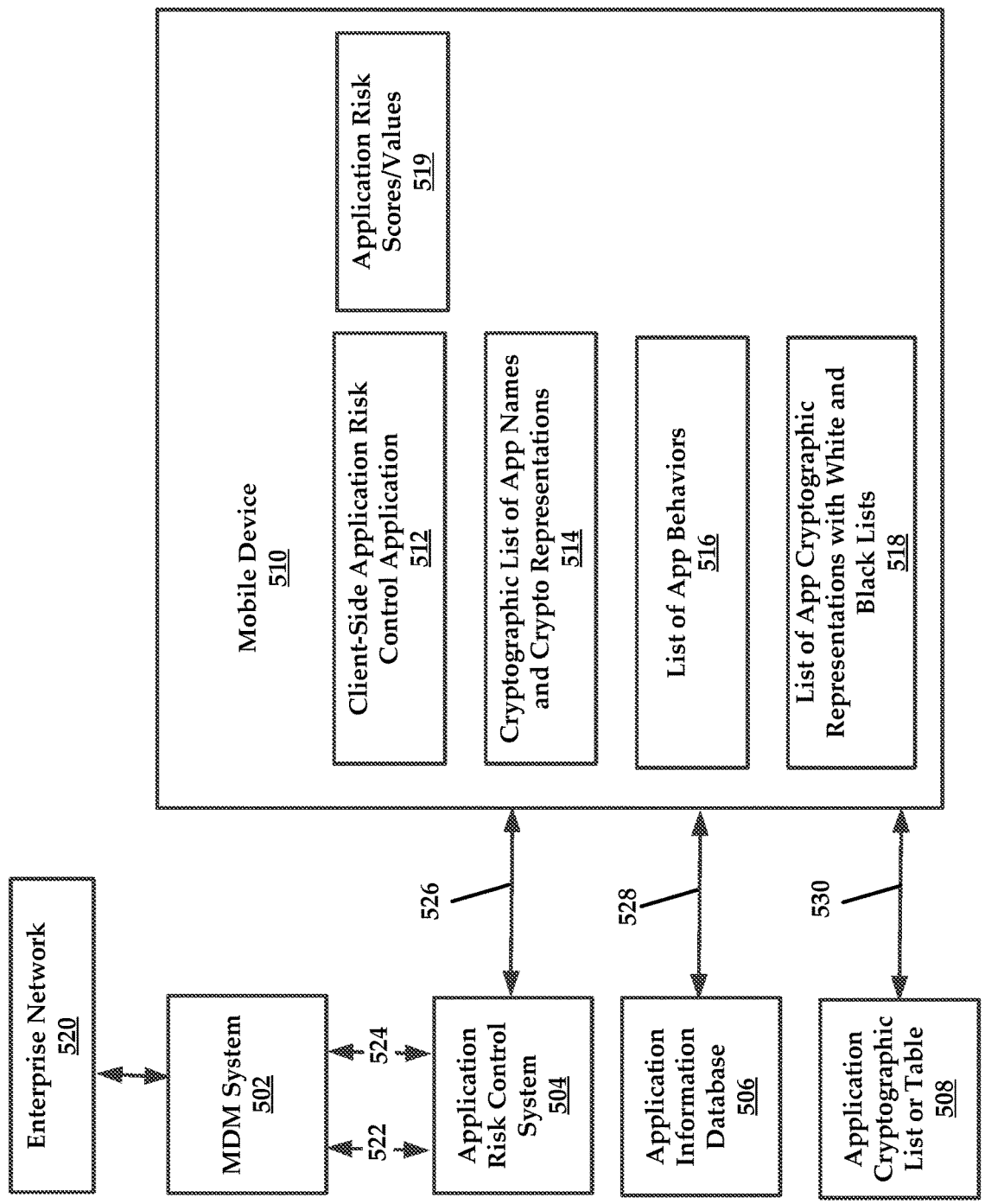
FIG. 5 is a schematic diagram of an example system for practicing aspects of the present technology.

Referring now to FIG. 5, a system 500 is illustrated which provides application risk mitigation as well as privacy for end users. The system 500 generally comprises a mobile device management (MDM) system 502, an application risk control system 504, an application information database 506, and an application cryptographic list or table 508.

These components 502-508 can communicate with a mobile device 510 that comprises one or more of a client-side application risk control application 512, a cryptographic list 514 of application names and their respective cryptographic representations, a list 516 of application behaviors, a list 518 of application cryptographic representations with whitelists and/or blacklists, and application risk scores/values 519. To be sure, the lists enumerated can be implemented as a log or file. Each of these lists can be implemented in a separate application or ASIC that is dedicated to a particular functionality associated with the list. In some embodiments, these features can be combined together into a single application that communicates with the components 502-508 of the system 500 as described in greater detail in the examples provided herein.

Figure 8:
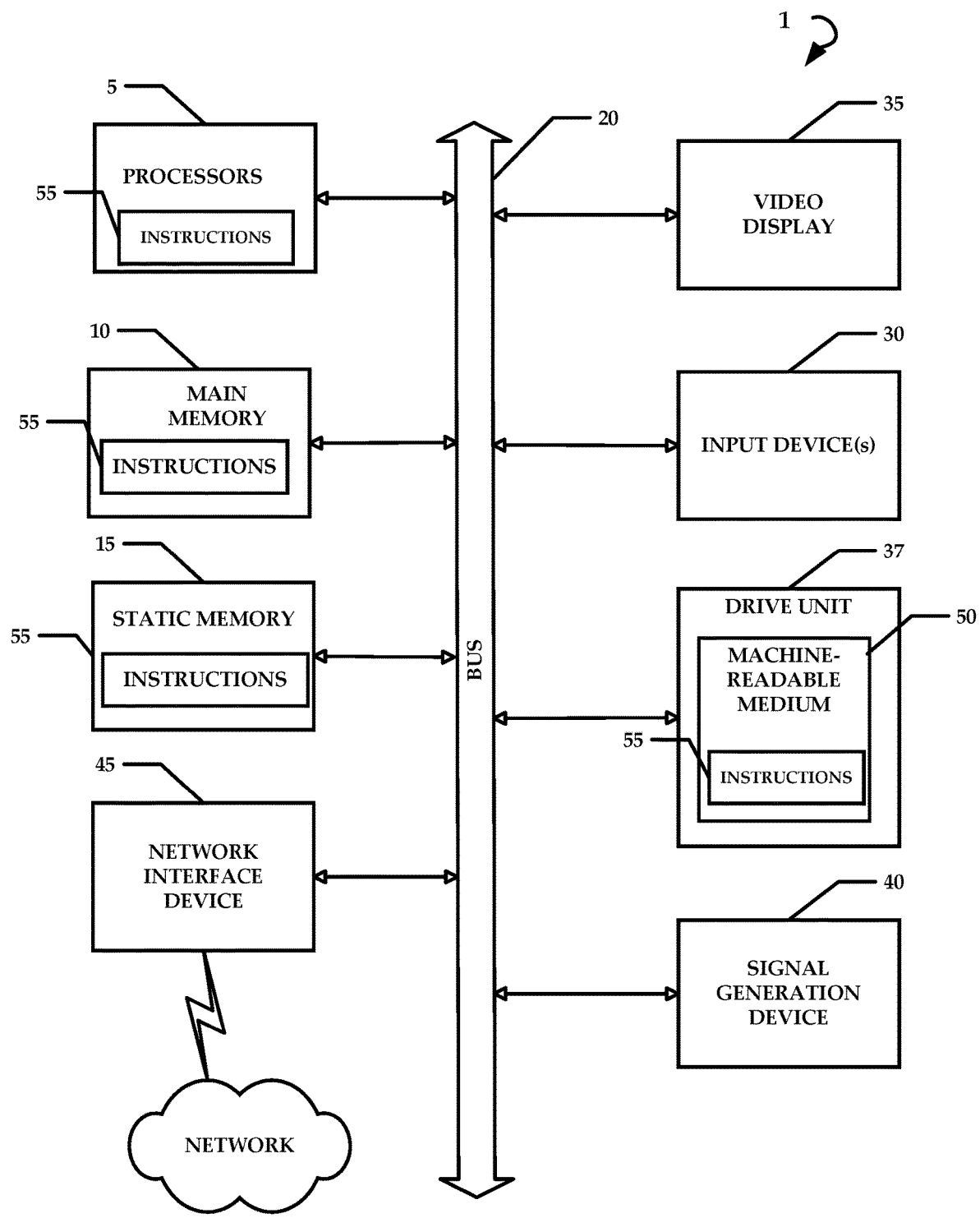
FIG. 8 is a schematic diagram of an example computer device that can be utilized to implement aspects of the present technology.

To be sure, each of the components of the system 500 can be implemented using parts or components of the computer system of FIG. 8, notwithstanding the unique systematic components of the system 500 that create a particular purpose computing system. Examples of these unique components include, but are not limited to, specific interfaces that control the flow of information to and from the various components of the system 500 which allow for application risk mitigation and user privacy.

The MDM system 502, in general, can control configuration of mobile devices, such as mobile device 510. The MDM system 502 may enforce required policies on the mobile devices including remediation actions. A remediation action can include any action such as quarantining and/or retiring of an application, a mobile device, or both. A remediation action can also include warning messages (e.g., notifications) transmitted to users and/or system administrators. In general, a remediation action may be any step taken by the MDM system 502 in response to determining an application poses a risk to an enterprise network 520.

In various embodiments, the MDM system 502 can communicatively couple with the application risk control system 504 using an administrator policy configuration interface 522. An administrator can configure application related policies of the application risk control system 504 using the interface 522. The MDM system 502 can also implement a command control interface 524 that allows control commands to be exchanged between the MDM system 502 and the application risk control system 504. By way of example, the interface 524 allows for mobile device configuration changes, removal of the mobile device from the MDM system 502, alert generation, and reporting to occur. In some embodiments, the application risk control system 504 uses the interface 524 when it determines that a policy has been violated by a mobile device, such as when the mobile device installs an application that poses a risk to the MDM system 502 or the enterprise network 520 (or even possibly the mobile device 510). In some embodiments, the application risk control system 504 is integrated into the MDM system 502.

The application risk control system 504 can communicate with mobile devices. In some embodiments, the application risk control system 504 can communicate directly with an operating system on the mobile device 510 or with software integrated into an MDM client software on the mobile device 510 such as the client-side application risk control application 512.

In various embodiments, the application risk control system 504 allows administrators to configure controls that may include application whitelists, application blacklists, application risk scoring thresholds, application behavioral restrictions, and remediation policies such as notifications, quarantines and retiring devices from the MDM system 502.

In some embodiments, the application risk control system 504 does not receive information that would allow the application risk control system 504 to determine the applications on a user's device, thereby preserving the privacy of the user. The application risk control system 504 can use data obtained from the mobile device 510 to transmit policy enforcement commands over interface 524 to the MDM system 502. Information used to make these decisions includes information sent from the mobile device 510 over communication channel 526. The communication channel

526 could include any number of network connections used to access network, such as the network of FIG. 1, described above.

For example, the application risk control system 504 can receive a device identifier (such as a phone number, IMEI, MAC address, or other hardware identifier), a risk score of applications on the mobile device 510, a maximum risk score of any application on the mobile device 510, one or more behaviors of applications on the mobile device 510, and if any applications are included on a blacklist. To be sure, these types of information can be provided by the mobile device 510 and none of these types of information allow the application risk control system 504 or the MDM system 502 to determine the applications that reside on the mobile device 510. Nevertheless, the information obtained can allow the application risk control system 504 or the MDM system 502 to make informed decisions about general and specific aspects of the applications to determine if these applications or the mobile device should be allowed to access the enterprise network. In various embodiments, this type of configuration can provide fine-grained, yet application-anonymized controls.

In some embodiments, the client-side application risk control application 512 will provide information such as risk score, maximum risk score of an application, blacklist checking, and so forth.

As briefly mentioned above, the communication channel 526 between a mobile device 510 and the application risk control system 504 could comprise the Internet, a WiFi connection, a cellular phone connection, or similar network connection that would be known to one of ordinary skill in the art with the present disclosure before them. In various embodiments, some identifying information about the mobile device 510 is typically included over this communication channel 526, but the list of applications on the device is not included.

The application information database 506 can comprise many types of application specific information aggregated from various mobile devices or other resources such as application developers and application stores. Example types of application information include application names, code hashes (cryptographic representations of executable code for an application), information about application publishers, information and analysis of application behaviors, assessments of risks of applications, and behavioral categorizations of applications. Thus, in various embodiments, an application can be identified by matching any of these types of information. For example, when a mobile device provides a cryptographic representation of an application's executable code, this cryptographic representation can be queried against the application information database 506 for matching applications. Again, the information about the application itself can be de-identified such that the application name is not linked to the cryptographic representation of the code of the application. In exemplary embodiments, matching is performed on a server other than a control server (e.g., for the application risk control system 504) where policies/rules are being set. In exemplary embodiments, this control server checks if mobile device representations are risky. In other embodiments, the control server communicates with a separate server that checks if the mobile device representations are risky.

The application information database 506 may allow mobile devices to communicate with the application information database 506 without providing identifying information such as device hardware identifiers or company identifiers. In this way, the application information database 506, in some embodiments, does not record which devices requested information about which applications. This privacy feature can be facilitated by separating out application identifying or device identifying information in total, or by only transmitting such information on specific channels and to only specific components of the system 500.

In exemplary embodiments, a communication channel 528 is provided between a mobile device 510 and the application information database 506. In this example, the identity of the mobile device 510 and any company, with which it is associated, is not sent over this communication channel 528. Thus, the mobile device 510 can be configured to intelligently transmit certain types of information on certain channels to preserve the privacy of the user.

According to some embodiments, the mobile device 510 can query the application information database 506 with an application name, version number, or a cryptographic representation of application identifying information. The executable code may be cryptographically represented.

With respect to cryptographic representations, the mobile device 510 and system 500 can each utilize any form of cryptographic transformation such as hashing. Examples of hashing include, but are not limited to, MD5, SHA1, and SHA256.

It will be understood that, in some embodiments, the mobile device 510 can send to the application information database 506 information about the applications on the device, but does not send identifying information (e.g., information that would allow the system 500 or the system administrator to know the exact identity of the application(s)) about those to the application information database 506.

In some embodiments, the application information database 506 can inform the mobile device 510 that an application is not permitted, based on, for example, a risk score, blacklist, application behavior, or combinations thereof. The mobile device can avoid sending information to the application information database 506 about an application that is determined to be on a whitelist. In another embodiment, the mobile device 510 can avoid sending information to the application information database 506 about applications that are on the blacklist by simply notifying the application information database 506 that one or more applications are on the blacklist and are installed on a mobile device 510.

In yet another embodiment, the mobile device 510 can avoid sending information to the application information database 506 about applications with specific behaviors, merely indicating that one or more applications on the mobile device 510 have a certain behavior. In such cases, the mobile device 510 may offer the user the option to delete such applications without informing the application information database 506 about which applications are on the mobile device 510, or even without informing the application information database 506 that a specific user has an application with said behavior.

The application cryptographic list or table 508 can include a list of cryptographic representations of application names which are associated with whitelists and blacklists. These whitelists or blacklists can be created for a particular company or group of companies in some embodiments. In some embodiments, each company can have their own whitelist and blacklist, and this can be indicated either by a company identifier, and a list of application name cryptographic representations, or the company identifier can be a component of the application name cryptographic representation for the whitelist and blacklist, enabling multiple companies to combine whitelists and blacklists into one database.

In some embodiments, the database could be served up as a DNS responder or through other specifically programmed computing means. The list of application cryptographic representations does not require a mobile device to identify itself or the company to which it belongs. The mobile device 510 can query the application cryptographic list or table 508 through a specific interface, e.g., 530 in the example in FIG. 5. In some embodiments, the mobile device 510 utilizes a company identifier that it sends to the application cryptographic list or table 508 as well as the cryptographic representation of the name of the application. The cryptographic representation of the application can be combined with a version number, or the version number can be separate or omitted. A cryptographic representation of the name of the publisher of the application could be substituted for the cryptographic representation of the name of the application, in order to implement whitelists and blacklists across entire publishers instead of on an app-by-app basis.

In various embodiments, the communication channel or interface 530, between the mobile device 510 and the application cryptographic list or table 508, is not used for transmitting identifying information about the mobile device 510 and its users is typically. However, identifying information about the company may be sent over interface 530 in order to support separate whitelists and blacklists for different companies. In various embodiments, if the application name cryptographic values are combined with a specific company identifier by the mobile device 510, then no company identifying information is communicated over this channel, as it is provided in the combined cryptographic representation.

The client-side application risk control application 512 on the mobile device 510 may be utilized to communicate with the various elements of the application risk control system 504, the application information database 506, and application cryptographic list or table 508. The client-side application risk control application 512 could, in some embodiments, display information about the installed applications to the user of the mobile device 510.

As mentioned above, the client-side application risk control application 512 may utilize various lists or databases. For example, the client-side application risk control application 512 can utilize the cryptographic list 514 of application names and their respective cryptographic representations. Application name cryptographic representations could optionally be combined with application version numbers in some embodiments. The cryptographic representations could also be combined with a company name or identifier as part of the cryptographic representation.

The list 516 of application behaviors for each application on the mobile device 510 may include whether the application reads a contact database, if the application communicates over the Internet, if the application sends SMS messages, if the application uses the device camera, if the application uses the device microphone, as well as other identifiable behaviors or permissions of an application. These are merely example behaviors and one of skill in the art will recognize other behaviors. To be sure, these behaviors, either singly or in combination, can create security risks. Therefore, an analysis of one or more application behaviors can result in remediation of an application if such behaviors are known to pose a security risk. The level and severity of remediation can depend on the level of security risk posed, e.g., including retiring the mobile device for very severe risks. Again, these processes can occur without direct knowledge (such as an application name or developer name) of the application that is associated with these behaviors.

In various embodiments, the list 518 of application cryptographic representations with whitelists and/or blacklists includes information that is derived from the application cryptographic list or table 508, communicated over communication channel 530. These cryptographic representations may be combined with the list of applications that are on the mobile device 510. In some embodiments, the mobile device 510 sends a composite hash of the application identifier and the company identifier. This could be combined into a single hash identifier. In various embodiments, this allows multiple whitelists and blacklists for multiple companies to be provided by a single database of whitelists and blacklists, and prevents the whitelist and blacklist server from being able to obtain information about the device identity and the company identity.

In some embodiments, the application risk scores/values 519 list can be obtained from the application information database 506. These could be numeric values between 0-10 or 0-100 or any another scoring range. These risks scores may be communicated to the application risk control system 504 to enable it to make decisions about whether to issue commands over to the MDM system 502 to enforce policies on the mobile device 510. Additional details regarding the calculation of risk scores can be found above, e.g., with respect to description of FIGS. 1-4.

Figure 6:
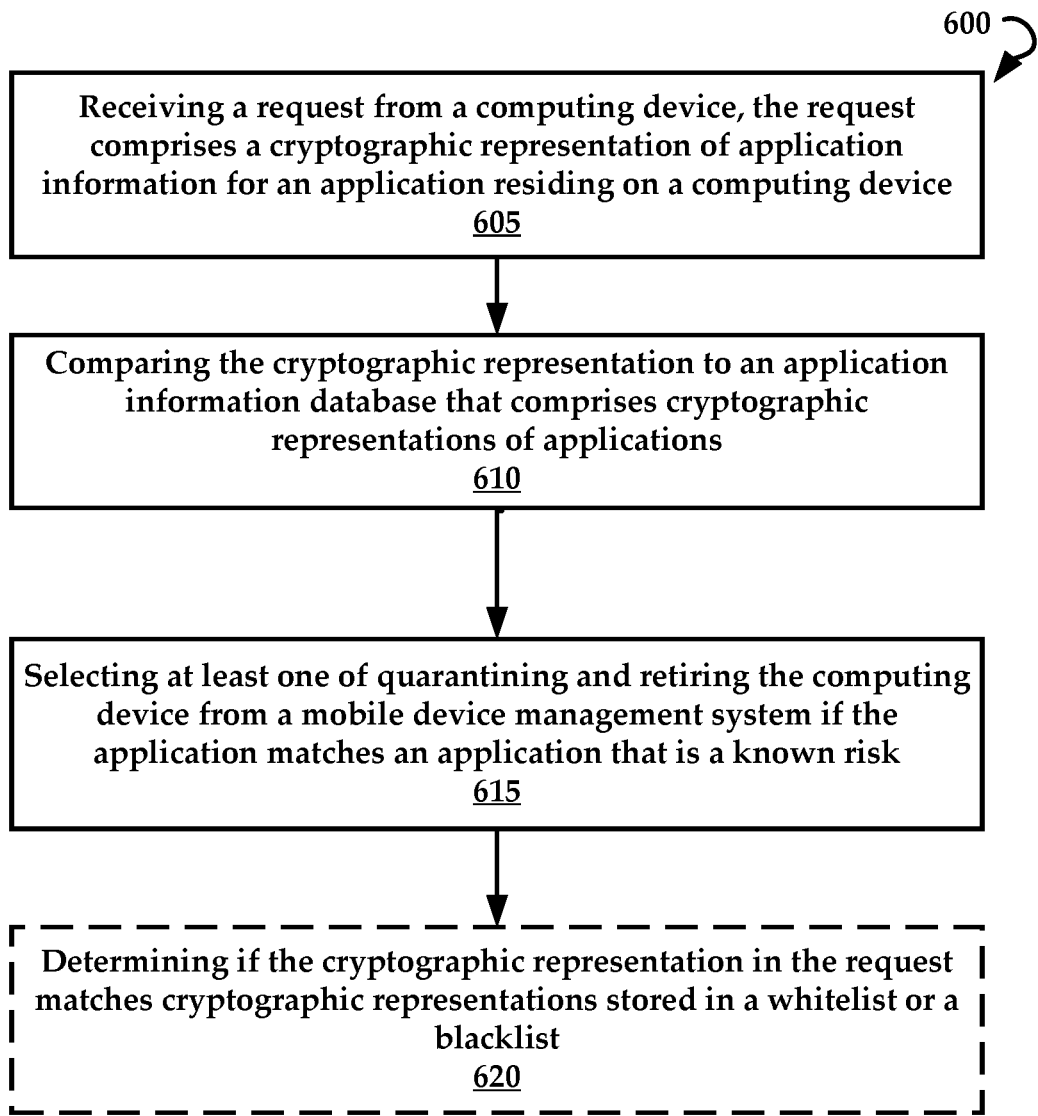
FIG. 6 is a flowchart of a method of private or anonymized application risk analysis.

In FIG. 6, a method 600 of private or anonymized application risk analysis is illustrated. The method comprises receiving 605 a request from a computing device, such as the mobile device 510. In some embodiments, the request comprises a cryptographic representation of application information for an application residing on a computing device. As mentioned above, the cryptographic representation of application information can include a cryptographic hash of the application name. Another hash could be created from the executable code of the application. Other identifying information can be hashed such as a version number or developer name. In various embodiments, these various types of application identifying information are converted or de-identified through a cryptographic hashing process to remove or reduce the likelihood that the identity of the application can be determined.

Next, the exemplary method includes comparing 610 the cryptographic representation to an application information database that comprises cryptographic representations of applications. This database may also include information for each application that determines if the application is a security risk or not. For example, the database can include risk scores, application behaviors, and other data that may indicate if an application is a known security risk.

In various embodiments, if a match is determined between the cryptographic representation included in the request, and one or more cryptographic representations stored in the database, an analysis is conducted to determine if the matching cryptographic representations stored in the database are known security risks.

If the match is determined to be associated with an application that is a known risk, the method can further comprise, at 615, automatically remediating the application if the application matches an application that is a known risk in the database. The remediating may variously include notifications, quarantining and/or retiring the mobile device (e.g., from a mobile device management system) if the application matches an application that is a known risk.

In addition to determining a match based on risk scores and behaviors, the exemplary method may also include determining 620 if the cryptographic representation in the request matches cryptographic representations stored in a whitelist or a blacklist.

Figure 7:
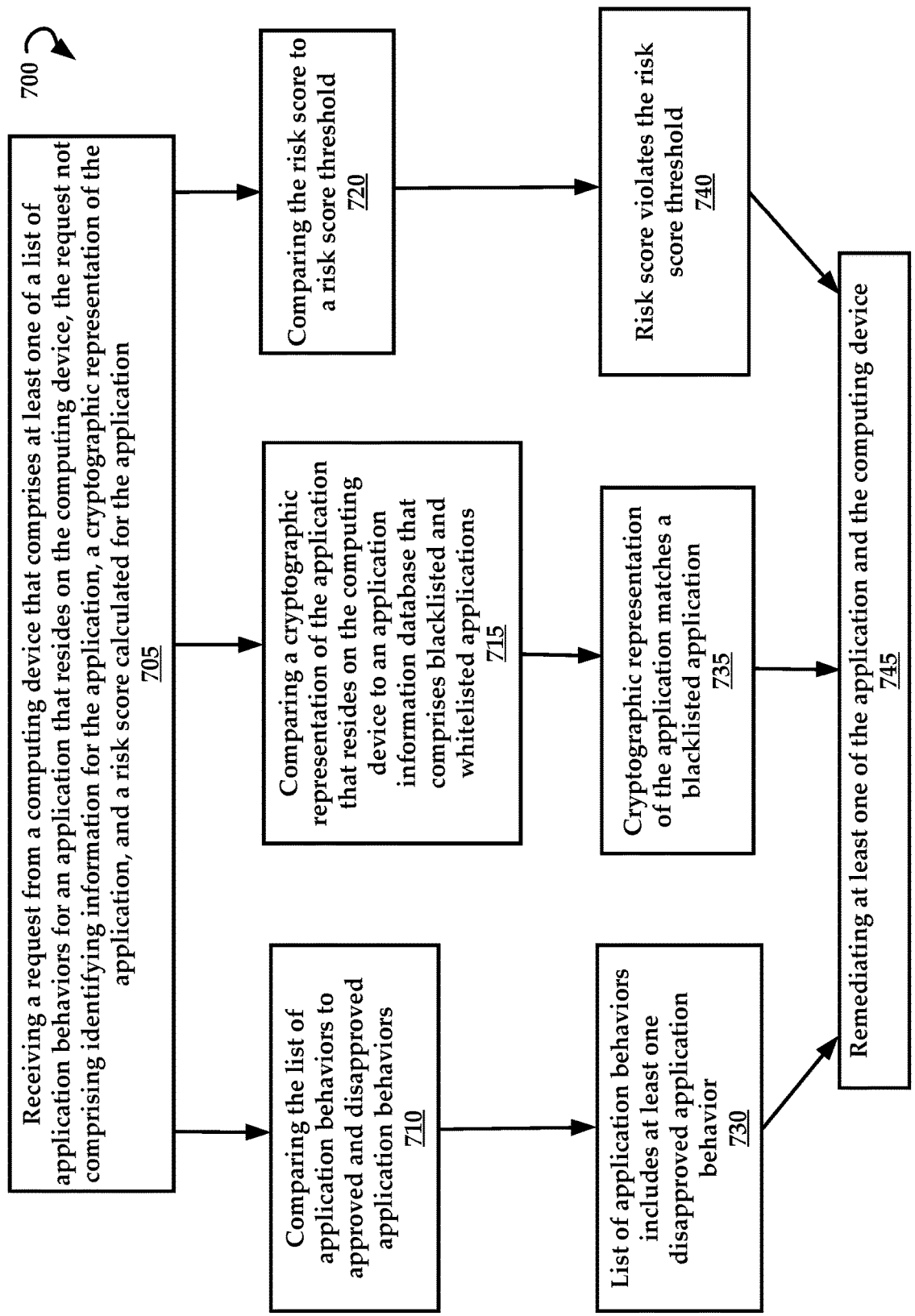
FIG. 7 is a flowchart of another example method of private or anonymized application risk analysis.

FIG. 7 is another method 700 of private or anonymized application risk analysis. The method includes receiving, at operation 705, a request from a computing device. The request comprises at least one of a list of application behaviors for an application that resides on the computing device, the request not comprising identifying information for the application, a cryptographic representation of the application, and a risk score calculated for the application. Various combinations of these features can also be utilized. Also, individual features can also be used. For example, in some embodiments, the method can utilize only application behaviors to determine if the application is a risk or not.

Next, the method includes comparing, at operation 710, the list of application behaviors to approved and disapproved application behaviors. Also, the method includes comparing, at operation 715, a cryptographic representation of the application that resides on the computing device to an application information database that comprises blacklisted and whitelisted applications. The method can also include comparing, at operation 720, the risk score to a risk score threshold. To be sure, operations 710-720 can occur in series or parallel.

Remediation can occur if, at operation 730, the list of application behaviors includes at least one disapproved application behavior. Remediation can occur if, at operation 735, the cryptographic representation of the application matches a blacklisted application and/or if, at operation 740, the risk score violates the risk score threshold. Thus, a multifactorial analysis can be utilized to evaluate the application for various aspects of risk. In some embodiments, the method can include remediating, at operation 745, at least one of the application and the computing device if one or more of operations 730-40 are found to be true.

As mentioned above, remediation can include quarantining or retiring the application or the mobile device, as described in greater detail above.

FIG. 8 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be, for example, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within static memory 15 and/or within the processors 5 during execution thereof by the computer system 1. The main memory 10, static memory 15, and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure. For example, the technology is not limited to use for stopping email threats, but applies to any messaging threats including email, social media, instant messaging, and chat.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method, comprising:
generating at least one cryptographic representation for a company identifier and at least one type of application information for an application residing on a mobile device, the at least one type of application information comprising an application name, the at least one cryptographic representation being a composite hash of both the application name and the company identifier;
transmitting the at least one cryptographic representation for determination of whether the application is permitted for a company identified by the company identifier; and
receiving the determination indicating whether the application is permitted for the company, the company being associated with a company specific permitted list or not permitted list comprising composite hashes of application names and company identifiers.

2. The method of claim 1, further comprising, in response to a request to install another application on the mobile device, generating at least one other cryptographic representation of at least one type of application information for the other application, the at least one other cryptographic representation being a composite hash of both a name of the other application and the company identifier, transmitting the at least one other cryptographic representation for determination of whether the other application is permitted for the company, and receiving the determination indicating whether the other application is permitted or not permitted for the company associated with the company identifier.

3. The method of claim 1, further comprising transmitting one or more application behaviors for the application without transmitting an identity of the application and without transmitting identifying information of the mobile device.

4. The method of claim 1, further comprising associating an application version with the at least one cryptographic representation.

5. The method of claim 1, wherein the at least one type of application information further comprises executable code of the application.

6. The method of claim 1, wherein the at least one type of application information further comprises a version number of the application.

7. The method of claim 1, wherein the at least one cryptographic representation further includes a composite hash value of the company identifier, the application name, executable code of the application and a version number for the application.

8. The method of claim 1, wherein the application is one of a plurality of applications on the mobile device, the generation of the at least one cryptographic representation, the transmission of the at least one cryptographic representation, and the receipt of the determination being performed for each of the plurality of applications.

9. The method of claim 1, wherein the determination is performed using an application information database.

10. The method of claim 1, wherein the determination is determined automatically by a processor configured to:
receive the at least one cryptographic representation of the at least one type of application information for the application residing on the mobile device;
compare the at least one cryptographic representation to an application information database and an application cryptographic table, the application information database comprising application information for a plurality of applications, the application information comprising at least one of application behaviors, application names, cryptographic representations of applications, and risk scores of applications, and the application cryptographic table comprising the cryptographic representations of applications associated with at least one of the permitted list or the not permitted list; and
automatically remediate the mobile device if the application matches an application that is a known risk as determined from the comparison with the application information database and the application cryptographic table, wherein the remediating comprises at least one of quarantining the application and retiring the mobile device.

11. The method of claim 1, further comprising detecting the application residing on the mobile device in response to a request by the mobile device to access network resources of the company.

12. A system, comprising:
a processor; and
a memory for storing executable instructions, the instructions being executed by the processor for:
generating at least one cryptographic representation for a company identifier and at least one type of application information for an application residing on a mobile device, the at least one type of application information comprising an application name, the at least one cryptographic representation being a composite hash of both the application name and the company identifier;
transmitting the at least one cryptographic representation for determination of whether the application is permitted for a company identified by the company identifier; and
receiving the determination indicating whether the application is permitted for the company, the company being associated with a company specific permitted list or not permitted list comprising composite hashes of application names and company identifiers.

13. The system of claim 12, the instructions being executed by the processor to further transmit one or more application behaviors for the application without transmitting an identity of the application and without transmitting the device identifying information of the mobile device.

14. The system of claim 12, the instructions being executed by the processor to further associate an application version with the cryptographic representation.

15. The system of claim 12, wherein the at least one type of application information comprises executable code of the application.

16. The system of claim 12, wherein the at least one type of application information comprises a version number of the application.

17. The system of claim 12, wherein the at least one cryptographic representation further includes a composite hash value of the company identifier, the application name, executable code of the application and a version number for the application.

18. The system of claim 12, wherein the application is one of a plurality of applications on the mobile device, the instructions being executed by the processor to evaluate each of the plurality of applications.

19. The system of claim 12, wherein the determination is performed using an application risk control system configured to:
   receive the at least one cryptographic representation of the at least one type of application information for the application residing on the mobile device;
   compare the at least one cryptographic representation to an application information database and an application cryptographic table, the application information database comprising application information for a plurality of applications, the application information comprising at least one of application behaviors, application names, cryptographic representations of applications, and risk scores of applications, and the application cryptographic table comprising the cryptographic representations of applications associated with at least one of the permitted list or the not permitted list; and
   automatically remediate the mobile device if the application matches an application that is a known risk as determined from the comparison with the application information database and the application cryptographic table, wherein the remediating comprises at least one of quarantining the application and retiring the mobile device.

20. A method, comprising:
   generating at least one cryptographic representation for a company identifier and at least one type of application information for an application residing on a mobile device, the at least one type of application information comprising an application name, the at least one cryptographic representation being a composite hash of both the application name and the company identifier;
   transmitting the at least one cryptographic representation for determination of whether the application is permitted to access an enterprise network with enterprise services of a company associated with the company identifier; and
   receiving the determination in the form of a message from an application risk control system indicating whether the application is permitted or not permitted to access the enterprise network with the enterprise services of the company associated with the company identifier, the indication based on a risk score calculated for the application, wherein the company is associated with a company specific permitted list and not permitted list each comprising composite hashes of application names and company identifiers.

* * * * *